UNITED STATES PATENT OFFICE.

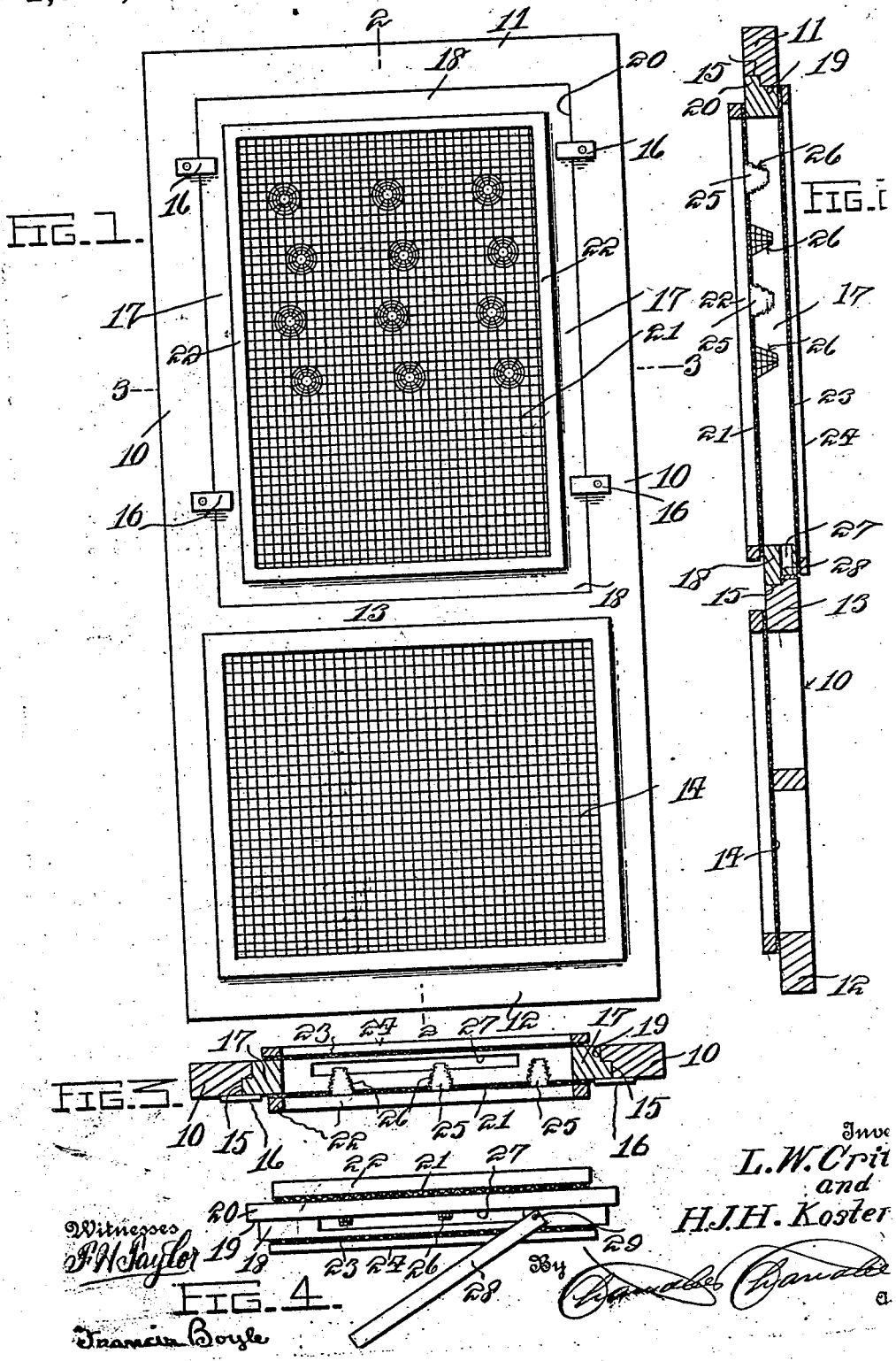

LAWRENCE W. CRITZER AND HANS J. H. KOSTER, OF PROTECTION, KANSAS.

SCREEN-DOOR TRAP.

1,081,369.　　　　Specification of Letters Patent.　　Patented Dec. 16, 1913.

Application filed August 19, 1912. Serial No. 715,886.

*To all whom it may concern:*

Be it known that we, LAWRENCE W. CRITZER and HANS J. H. KOSTER, citizens of the United States, residing at Protection, in the county of Comanche, State of Kansas, have invented certain new and useful Improvements in Screen-Door Traps; and we do hereby declare the following to be a full, clear, and exact description of the invention, such as will enable others skilled in the art to which it appertains to make and use the same.

This invention relates to screen door fly traps and has for an object to provide a novel fly trap which may be removably attached to the screen door in lieu of the usual screen, and will be inconspicuous when applied.

A further object of the invention is to provide a fly trap having a marginal flange adapted to seat in a countersink run around the inner edge of the door frame, and over which flange securing buttons carried by the door frame may be turned to secure the trap in position.

With the above objects in view the invention consists of certain novel details of construction and combination of parts hereinafter fully described and claimed, it being understood that various modifications may be made in the minor details of construction within the scope of the appended claim.

In the accompanying drawing forming part of this specification:—Figure 1 is a front elevation of a screen door equipped with our improved trap. Fig. 2 is a longitudinal sectional view taken on the line 2—2 Fig. 1. Fig. 3 is a cross sectional view taken on the line 3—3 Fig. 1. Fig. 4 is a bottom plan view of the trap showing the fly removing closure open.

Referring now to the drawing in which like characters of reference designate similar parts, 10 designates the side stiles, 11 and 12 the top and bottom rails, 13 the intermediate rail, and 14 the lower screen member of an ordinary screen door. A rabbet 15 is run around the inner perimeter of the rectangular frame formed by the side stiles and top and intermediate rails of the door. A plurality of buttons 16 are swiveled on the side stiles and are turnable over this rabbet to secure the trap which will be presently described therein. The trap comprises a rectangular frame including spaced longitudinal bars 17 which are connected at their upper and lower ends by cross bars 18. A rabbet 19 is run around the outer perimeter of this frame with a resultant marginal flange 20 which is adapted to seat in the rabbet 15 of the screen door and dispose the front faces of the longitudinal and cross bars of the trap frame flush with the corresponding stiles and rails of the screen door so that the buttons may be turned over the marginal flange to secure the trap in position.

A screen member 21 is secured to the rear faces of the longitudinal and cross bars of the trap frame by means of batten strips 22. A second screen member 23 is secured to the front faces of the longitudinal and cross bars of the trap frame by means of batten strips 24. A plurality of entrance openings 25 are formed in the front screen member 23 in staggered relation to each other, and entrance cones 26 are secured to the marginal edges of these openings as clearly shown in Figs. 2 and 3. A longitudinal discharge slot 27 is formed in the lower cross bar of the trap frame, and is normally closed by a hinged leaf 28, the leaf being hinged at one end to the bottom face of the cross bar by means of a pivot pin 29.

When it is desired to remove the trap, the buttons 16 are turned back and the trap may then be bodily withdrawn from the door. The hinge leaf may then be rocked open and the dead flies shaken out from the trap through the discharge opening in the lower cross bar.

What is claimed, is:—

The combination with a screen closure including a frame having a rabbet run around the inner edge, of an insect trap comprising a rectangular frame having a marginal external flange adapted to seat in said rabbet, means to removably secure said trap to said closure, parallel screen members on the opposite faces of said trap frame, entrance cones carried by one of said members, a discharge slot formed in the bottom of said trap frame, and a leaf hinged at one end on the bottom face of said trap frame and normally closing said discharge slot, said leaf being clamped between said bottom face and the bottom wall of said recess and thereby held closed.

In testimony whereof, we affix our signatures in presence of two witnesses.

LAWRENCE W. CRITZER.
HANS J. H. KOSTER.

Witnesses:
W. W. BAXTER,
J. P. CUMPTON.